United States Patent

[11] 3,612,290

[72] Inventor Robet J. Evans
     Aurora, Ill.
[21] Appl. No. 849,426
[22] Filed Aug. 12, 1969
[45] Patented Oct. 12, 1971
[73] Assignee Aurora Equipment Company
     Aurora, Ill.

[54] RELEASABLE KEY CLAMP FOR A PALLET RACK
     12 Claims, 6 Drawing Figs.
[52] U.S. Cl. .................................................. 211/176,
                                                          211/148
[51] Int. Cl. ................................................ A47f 5/10
[50] Field of Search ................................... 211/176,
     148, 177; 248/243, 220.5, 165; 108/106-109, 146;
                                              215/55; 292/85

[56] References Cited
     UNITED STATES PATENTS
     46,472    2/1865  Jenks ............................ 292/85
  1,235,075    7/1917  Stamm .......................... 292/85
  2,127,280    8/1938  Zimbalist ....................... 248/243
  3,273,720    9/1966  Seiz .............................. 211/148
  3,303,937    2/1967  McConnell .................... 211/148

Primary Examiner—Ramon S. Britts
Attorney—Hill, Sherman, Meroni, Gross & Simpson ABSTRACT: A connecting structure adapted to adjustably and releasably connect two supporting members of a structure such as a pallet rack. The connecting structure includes one structural member having headed connecting elements spaced thereon and the other structural member having spaced slots or apertures having a wide portion for receiving the headed connecting elements and a narrow portion preventing the removal of the connecting elements once they are inserted therein. To prevent the accidental disengagement of the headed connecting element from the slots, a safety locking means comprising a pin-locking member urged by a spring through an aperture adjacent one of the connecting elements into the wide portion of the slot receiving the connecting element is provided and includes a release lever engageable with the spring to release the spring pressure holding the locking pin in its locking position and to withdraw the locking pin to enable the disassembly of the connecting structure or system.

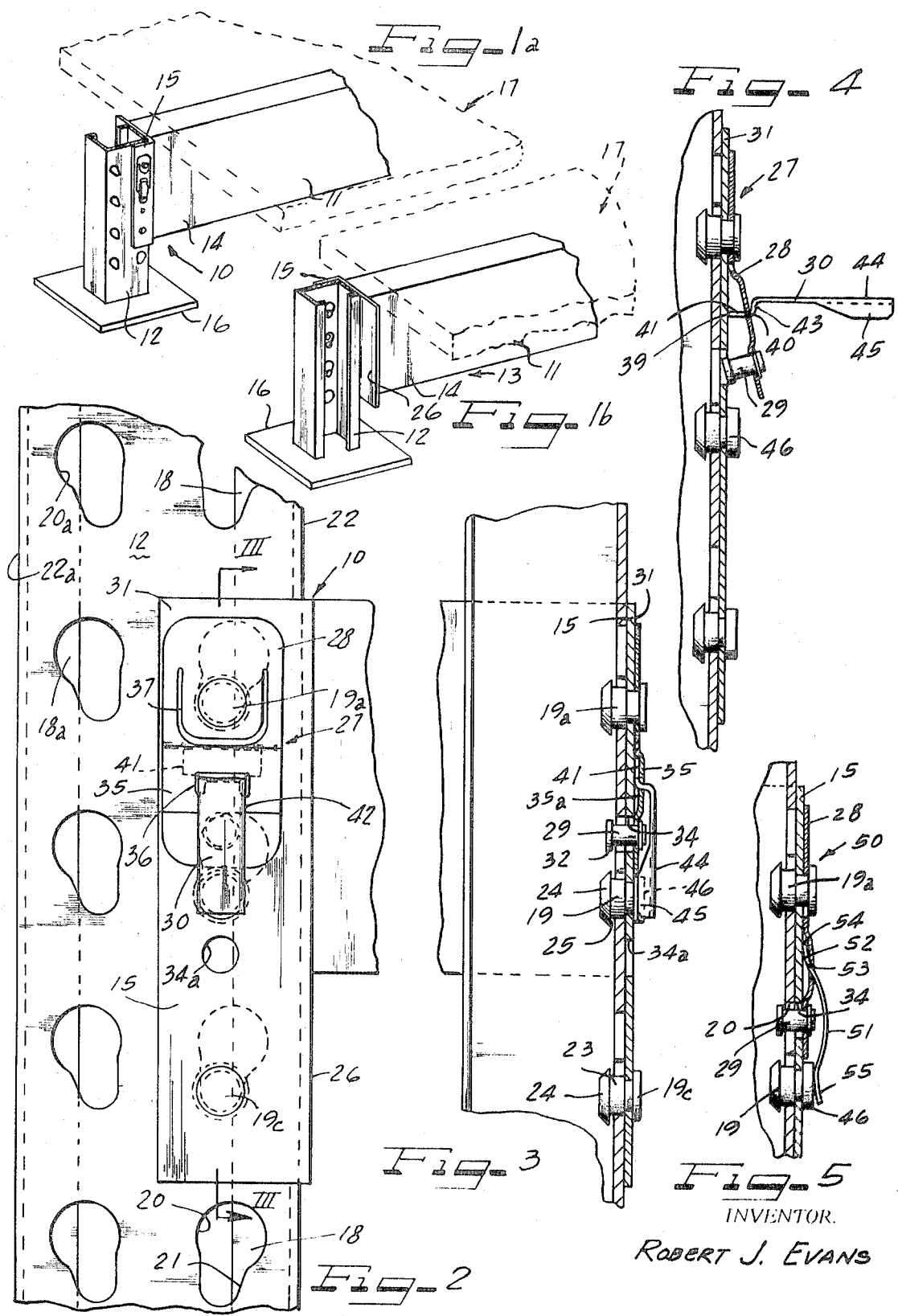

RELEASABLE KEY CLAMP FOR A PALLET RACK

BACKGROUND OF THE INVENTION

1. Field of the Invention

This invention relates to a connecting system for support members and more particularly to the construction of a device having a key clamp with a locking pin to prevent accidental disengagement of the key clamp.

2. Prior Art

Adjustable racks or frames utilizing an adjustable connection between horizontal and vertical members with the vertical member having a plurality of spaced keyholed slots with a wide portion for receiving a headed connecting element or stud and a narrow portion preventing the removal of the stud while engaged with the edges of the narrow portion have had problems such as the connecting elements being moved into the wide portion during the loading of articles in the rack and therefore causing accidental disengagement of the connection of the members of the rack or structure. To eliminate this problem various safety devices such as a pin mounted on a leaf-type spring which urges the pin into the wide portion of the slot to prevent the connecting element occupying the slot from moving into the wide portion have been provided. While such a locking member prevents the accidental disengagement of the connecting means or joint, the existing safety structure has not proved satisfactory due to damage to the spring element during the assembly and disassembly of the joint. The major cause of damage to the spring element is the application of too great a force to withdraw the locking element which force creates a permanent set or deformation of spring element. In many cases, a permanent set of the spring element prevents the locking pin from being properly inserted into the wide portion of the slot, and thus the safety means becomes inoperative and enables the accidental disconnection of the joint with subsequent damage to the article stored on the rack and injury to personnel in the area.

SUMMARY OF THE INVENTION

The present invention provides a connecting structure having a pair of support members one of which is provided with spaced headed connecting elements receivable in spaced slots having wide portions and narrow portions which are in the other support member, and a safety means including a lock member biased by a spring means into a wide portion of one of the slots to prevent movement of a connecting element therein and release means for releasing the spring force applied on the lock member and for withdrawing the lock member from the wide portion to enable the connection and disconnection of the joint. In the preferred embodiment, the release means is a lever having spaced abutment surfaces which lever is moved to the releasing position with the spaced abutment surfaces engaging the spring means and a surface of the support member on which the spring means is attached to release the spring pressure and to retract the lock member to a position enabling the connecting and disconnecting of the joint.

BRIEF DESCRIPTION OF THE DRAWINGS

FIG. 1a is an isometric view with portions broken away for purposes of illustration of a rack assembly having support means interconnected by the connecting means of the present invention;

FIG. 1b is an isometric view with portions broken away of the opposite side of the rack of FIG. 1a.

FIG. 2 is an enlarged plan view of the interconnection of the pair of support means by the present invention;

FIG. 3 is a cross-sectional view taken along the lines III—III of FIG. 2.

FIG. 4 is a cross-sectional view similar to that of FIG. 3 with the safety means in a released position; and FIG. 5 is a cross-sectional view of a modified embodiment of the present invention.

DESCRIPTION OF THE PREFERRED EMBODIMENT

Although the principles of the present invention are of utility in any detachable connecting means construction they are particularly useful when incorporated in an adjustable storage rack of the like and an illustrative embodiment herein shown illustrates the novel connecting means used in a pallet rack structure. Other features and advantages of the invention will be readily apparent from the following description of certain preferred embodiments thereof taken in conjunction with the accompanying drawings, although variations and modifications may be effected without departing from the spirit and scope of the concept of the disclosure.

The principles of the present invention are illustrated in a connecting means or system generally indicated at 10 for detachably interconnecting horizontal support members 11 to a vertical support member or column 12 of a pallet rack assembly generally indicated at 13. The horizontal support member 11, which is illustrated as being of a rectangular cross section, may be an I-beam, a channel member, or a metal member bent in a Z-shaped cross-sectional configuration and has its end attached to an L-shaped flanged member or element 15.

Each of the vertical support members 12 are illustrated as rectangular-shaped channel members having one end mounted on a base 16. Supported on the horizontal members such as 11, (FIG. 1a), is a platform or decking generally indicated in broken lines at 17. The platform 17 may be a pallet which is adapted to be lifted or transported by conventional means such as a forklift truck and may be provided with runners to hold the surface above the horizontal support members 11 a sufficient distance to allow the insertion and removal of the prongs of the forklift truck. The vertical columns 12 may be provided with means to maintain the horizontal distance therebetween such as a structural crossmember not illustrated.

The connecting means 10 is formed by providing rows of spaced slots 18 and 18a along each side 22 and 22a of the vertical column 12 and by providing spaced connecting elements 19 (FIG. 3) which are received in the slots 18. As best shown in FIGS. 2 and 3, the slots 18 have a wide portion 20 connected to a narrow portion 21. The centerline of the slots 18 is inclined with respect to a side 22 of the column 12 so that the narrow portion 21 is offset toward the center of the column 12 with respect to the wide portion 20 and thus the fastening element 19 when moving from the wide portion 20 into the narrow portion 21 draws a leg or flange 26 of the flanged member 15 into snug engagement with the side 22.

The connecting elements 19 are attached to flange member 15 and have a portion 23 of a diameter to be received in the narrow portion 21 of slot 18 and a head portion 24 of greater diameter than the narrow portion 21 but a slightly less diameter than the wide portion 20. Thus, a surface 25 of the head 24 engages the edges of the narrow portion 21 when the connecting element or studs 19 is moved into the narrow portion 21. As mentioned above, the movement of the studs 19 from the wide portion 20 into the narrow portion 20 causes a lateral movement of the flange element 15 resulting in the leg 26 engaging the side 22 of the vertical support member 12. As illustrated, the spacing between the studs 19 is equal to the spacing between the slots 18.

In order to prevent the accidental upward movement of the flange member 15, which carries the studs 19, a safety means or locking means generally indicated at 27 is provided and includes a spring means 28 carrying a locking member 29 and a release means such as lever means 30. As illustrated, the spring means 28 is attached to an outer surface 31 of the flanged member 15 and is preferably riveted along with the attachment of one of the connecting studs 19a. Opposite the point of attachment, the spring means 28 carries the locking member 29 which is illustrated to be a pin having a head 32 extending through an aperture 34 in the member 15. The head 32 can be eliminated, if desired.

The spring member 28 is provided with an offset portion 35 intermediate the point of attachment of the locking pin 29 and point of attachment to the stud 19. The offset portion 35 is provided with aperture 36 for receiving the lever means 30 and provides a space 35a, which is adjacent the aperture 36, between the surface 31 and the spring member 28. As best illustrated in FIG. 2, the spring means 28 is also provided with a U-shaped aperture or slot 37 adjacent to its point of connection to the flanged member 15 to facilitate the resilient movement of the locking member 29. The spring means 28 applies a force which biases or urges the locking member 29 into the engagement position illustrated in FIG. 3 which position has the pin 29 extending through the aperture 34 and into the wide portion 20 of the slot 18 to permit only a slight amount of upward or relative movement of the connecting stud 19 toward the wide portion 20. When the movement occurs, the head 32 of pin 29 prevents the removal of the pin from the wide portion 20 until the stud 19 is moved back into the narrow portion 21.

The lever means 30 which is received in the aperture 36 has a pair of spaced, oppositely facing abutment surfaces 39 and 40. The abutment surface 39 is the end of the lever means 30 and the abutments 40 are defined by a shoulder formed by a wide portion 41 adjacent the end and a narrow portion 42 which extends through the slot 36. Portion 42 adjacent the abutment 40 is provided with an S-shaped bend 43 comprising a pair of right-angle bends which provides an offset of the wide portion 41 from the narrow portion 42 and enables the wide portion 41 to lie substantially flat in the space 35a between the surfaces 31 and the spring element 28 when the spring element has biased the locking element 29 to the locking position.

The opposite end 44 of the lever means 30 is provided with a pair of bent side portions 45, 45 which overlie the deformed head 46 of the connecting element or stud 19 adjacent to the apertures 34 in the flanged member 15 as the lever 30 is in a released position with the abutment surface disengaged from the spring and member 15 allowing the spring element 28 to urge the locking element or pin 29 in the safety locking position.

Another embodiment of the safety means is illustrated in FIG. 5 and is generally indicated at 50. The safety means 50 utilizes a spring member similar to member 28 which is held by the deformed head of the locking element 19 onto the flanged member 15 and a lever means 51 inserted in an aperture of the spring member. The member 28 carries at one end a locking element or pin 29 which in the safety locking position extends through the aperture 34 and into a wide portion 20 of the slot 18.

The major difference in the structure of the safety means 50 and the safety means 27 is in the structure of the lever means 51 which is curved member terminating at one end with a wide portion 52 which provides shoulders or abutment surfaces 53 which face oppositely to the abutment surface defined by the end 54. The lever means 51 is movable from a released position illustrated in FIG. 5 with the free end 55 resting on the deformed head 46 of a connecting element 19 to an outwardly extending position wherein the end 54 bears on the surface of the member 15 while the abutment surfaces or shoulders 53 bear on the underneath side of the spring element 28 to release the spring forces on the locking pin 29 and to withdraw it from its engagement in the wide portion 20 of the slot 18.

In the two embodiments illustrated in FIGS. 3 and 5, the lever means 30 or 51 are flipped upwardly or raised upwardly to disengage the locking pins 29. The lever means 30 and 51 could both be inserted in the aperture of the spring element 28 so that the ends 44 and 55 respectively would cover or contact the deformed head of the stud 19a which is attaching the spring element 28 to the flanged member 15. In this proposed position, a downward movement of the ends 44 or 55 would cause the withdrawal of the locking pin 29 from the wide portion 29 of the slots 18. Regardless of which way the lever means such as 30 is inserted in the aperture 36, the outwardly extending positions (FIG. 4) holds the locking element in the withdrawn position and enables the assembler to quickly determine which locking members 29 have been withdrawn from the wide portion 29 of the slots 18. Thus this indication by the position of the lever means 30 or 51 enables a quick determination whether the locking pin 29 of the safety locking means 27 or 50 is engaged or withdrawn.

In the embodiments illustrated, the safety means 27 and 50 have been illustrated as being attached to the upper connecting element or stud 19 with the pin 29 passing thorough an aperture adjacent to the middle stud 19. Since the connecting means 10 is illustrated to attach or cooperate with the apertures 18 along the side 22, it would not cooperate with the apertures 18a along the side 22a because the pin 29 would not be in a position to be received in the wide portion 20a of the slots 18a. In order to be usable with the slots 18a, an aperture 34a below the center stud 19 is required and another safety means 27 attached to the stud 19c with an element 29 to cooperate with the aperture 34a would be required. Thus to render the flanged element 15 capable of forming a connection with column 12 from either side 22 or 22a would require a pair of locking means 27, one attached to the stud 19a and the other attached to the stud 19c.

Applicant's lever means 30 to 51 provides the necessary displacement by the cooperation of the oppositely facing abutments to move the spring 28, the required distance to withdraw the locking pin 29 from the wide portion 20 of the slots 18 to enable engagement and disengagement of the studs 19 from the slots 18. Since the abutment surfaces of the lever means 30 or 51 are a predetermined distance, they will not overspring or create a force sufficient to permanently deform the spring element 28 which occurs when such spring elements similar to 28 were sprung apart by other means such as screwdrivers, or other tools used by the assembler. Therefore, the provision of the lever means such as 30 or 51 prevents the application of an excessive force to the spring element 28 which would cause a permanent set or deformation of the spring and which would cause the malfunction of the locking element 29 with a possible safety hazard to the personnel working the area of pallet rack 13 and the possible damage of goods by an accidental disconnection of a connecting means 10.

I claim as my invention:

1. a system for connecting a pair of support members which comprises a first support member and a second support member, said first member having vertically spaced slots, each of said slots having a wide portion and a narrow portion; said second member having vertically spaced studs with each of said studs having an enlarged head smaller than said wide portion and larger than said narrow portion so that said stud can be inserted into the wider portion of said slot and move laterally to said narrow portion for engagement with the wall adjacent said narrow portion thereby preventing straight line separation of said members, said second member having an aperture adjacent at least one of said studs and positioned for alignment with said wide portion when said one stud is engaging the wall adjacent said narrow portion; and locking means including a spring member attached to one side of said second member, a lock member attached to said spring member and disposed in said aperture, said lock member being movable between a first position projecting from the opposite side of the second member into the wide portion of the slot and a second position withdrawn from the wide portion of said slot, said spring member urging said lock member to the first position, and lever means engaging said spring member adjacent said locking member and movable from a position substantially parallel to the one side of said second member to an outwardly extending position acting between the one side of the second member and said spring member to withdraw and hold said locking member in said second position during assembly and disassembly operation of said support members.

2. A system according to claim 1, wherein said studs are riveted to said second member and said spring member is attached to the riveting of one of said studs.

3. A system according to claim 1, wherein said spring member is a leaf spring type having an aperture, said lever means being received in said aperture and having abutment surface engaged with said spring member adjacent said aperture.

4. A system according to claim 3, wherein said lever means includes an S-bend adjacent said abutment surfaces so that the abutment surfaces are offset from the remainder of the lever means.

5. Connecting means for securing two structural members together in an assembled relationship comprising;
a first structural member having spaced headed connecting elements projecting from one face of said member,
a second member having spaced apertures having wide portions for enabling insertion of said headed elements therethrough and narrow portions for engaging the headed elements to prevent removal from said aperture, so that said first and second support members are assembled by inserting the headed elements in the wider portions of the slots and laterally moving the insert headed elements into the narrow portions,
locking means disposed on said first member to prevent accidental disconnection of the headed connecting elements from said apertures, said locking means including a lock member carried by a spring member and movable between a position projecting into the wide portion of an aperture of said second member and a second position withdrawn from said wide portion, and
release means movable from a position substantially parallel to the first structural member to an outwardly extending position to act between said spring member and first structural member for moving said lock member to said second position and holding the locking member in said second position to enable disassembly of said connecting means.

6. Connecting means securing two structural members together in an assembled relationship comprising:
a first structural member having spaced headed connecting elements projecting from one face of said member,
a second member having spaced apertures having wide portions for enabling insertion of said headed elements therethrough and narrow portions for engaging the headed elements to prevent removal from said aperture, so that said first and second support members are assembled by inserting the headed elements in the wider portions of the slots and laterally moving the inserted headed elements into the narrow portions,
locking means disposed on said first member to prevent accidental disconnection of the headed connecting elements from said apertures, said locking means including a lock member carried by a spring member and movable between a first position projecting into the wide portion of an aperture of said second member and a second position withdrawn from said wide portion, and
a lever means having spaced oppositely facing abutment surfaces assembled with said spring member and being movable between a position substantially parallel to the first structural member wherein said abutment surfaces are withdrawn from contact with said spring member and the other face of said first member and an outwardly extending position having said abutment surfaces engaging said other face and said spring member to counteract said spring force and to hold said locking member in the second position enabling disassembly of said connecting means.

7. A connecting means according to claim 6 wherein said first member has an aperture adjacent one of said headed connecting elements and said lock member is shiftably disposed therein.

8. A connecting means according to claim 6, wherein said spring member is a leaf-type spring having an aperture therein, and wherein said lever means has a portion received in the aperture of said spring member with the abutment surfaces disposed between said spring member and the other face of said first member.

9. A connecting means according to claim 8, wherein said lever means has a wide portion defining said abutment surfaces and a bent portion adjacent the wide portion defining an offset enabling said lever means to be close to said spring member when said locking pin is in said first position.

10. In a system for connecting a pair of support members utilizing spaced headed stud members inserted through spaced apertures of a keyhole configuration, and having lock means including a lock member insertable in a wide portion of one of said keyhole slots and urged into said wide portion by a spring member to prevent the accidental disconnection of the support members, the improvement comprising a lever means having abutment surfaces engaging the spring member and a face of one of the support members supporting said spring member, said lever member being movable from a position substantially parallel to said face with the abutment surfaces out of engagement with the spring member and said face to an outwardly extending position with the abutment surfaces contacting said spring member and the face and holding the spring away therefrom to withdraw and hold the locking member out of the wide portion of the aperture of the other member to enable disassembly of the support members.

11. A pallet rack having vertical and horizontal support members with the horizontal members connected to the vertical members by an adjustable connection comprising: a first support member having spaced headed connecting elements extending from one side thereof receivable in spaced slots in a second member, said slots having a wide portion enabling the insertion of the headed connecting element therein and a narrow portion engaging the head of the connecting element to prevent removal therefrom and including a safety locking means including a locking member carried by a spring member attached to one of said support members, said spring member biasing a locking member into the wide portion of one of said slots for preventing the accidental removal of the headed connecting elements therefrom, and release means movable from a position substantially parallel to said first member to an outwardly extending position for applying a predetermined force between said first member and said spring member to remove the biasing force applied to the locking member and to withdrawn and hold said locking member from its position in said wide portion of said one slot to enable disassembly of the support members.

12. A system for connecting a pair of support members which comprises:
a first support member having spaced headed connecting members thereon;
a second support member having spaced apertures, each aperture being capable of receiving one of said headed connecting member and having a portion for engaging the headed connecting member received therein as said first and second support members are moved laterally relative to each other thereby preventing straight line separation of said headed connecting member from its aperture to form a connection between said support members;
locking means mounted on one of said support members, said locking means having a locking member carried by a spring member and being biased by said spring member into coaction between said first and second support members as said connection is formed to limit relative lateral movement therebetween and thereby preventing inadvertent removal of said connecting members from their apertures and disassembly of said connection; and
release means movable from a position substantially parallel to said one member to an outwardly extending position for applying a predetermined force between said first member and said spring member to remove the biasing force applied to the locking member and to withdraw and hold said locking member from its coaction between said support members to enable disassembly of the connection of said support members.

UNITED STATES PATENT OFFICE
CERTIFICATE OF CORRECTION

Patent No. 3,612,290      Dated October 12, 1971

Inventor(s) Robert J. Evans

It is certified that error appears in the above-identified patent and that said Letters Patent are hereby corrected as shown below:

Column 3, lines 72 and 73, "portion 29" should read --portion 20--.

Column 4, line 3, "portion 29" should read --portion 20--;

line 24, "to" should read --or--;

line 75, "to" should read --by--.

Column 6, line 43, "withdrawn" should read --withdraw--.

Signed and sealed this 10th day of October 1972.

(SEAL)
Attest:

EDWARD M. FLETCHER, JR.
Attesting Officer

ROBERT GOTTSCHALK
Commissioner of Patents